US 9,219,924 B2

(12) United States Patent
Chiu et al.

(10) Patent No.: US 9,219,924 B2
(45) Date of Patent: Dec. 22, 2015

(54) SPATIAL SCALABLE VIDEO CODING USING NON-SCALABLE VIDEO CODEC

(71) Applicant: Hong Kong Applied Science and Technology Research Institute Company Limited, Hong Kong (HK)

(72) Inventors: Man Yau Chiu, Hong Kong (HK); Zhi Bin Lei, Hong Kong (HK)

(73) Assignee: Hong Kong Applied Science and Technology Research Institute Company Limited, Hong Kong Science Park, Shatin, New Territories, Hong Kong (CN)

(*) Notice: Subject to any disclaimer, the term of this patent is extended or adjusted under 35 U.S.C. 154(b) by 397 days.

(21) Appl. No.: 13/951,471

(22) Filed: Jul. 26, 2013

(65) Prior Publication Data

US 2015/0030072 A1    Jan. 29, 2015

(51) Int. Cl.
| | |
|---|---|
| H04N 19/34 | (2014.01) |
| H04N 19/51 | (2014.01) |
| H04N 19/85 | (2014.01) |
| H04N 19/33 | (2014.01) |
| H04N 19/59 | (2014.01) |

(52) U.S. Cl.
CPC ............... *H04N 19/85* (2014.11); *H04N 19/33* (2014.11); *H04N 19/59* (2014.11)

(58) Field of Classification Search
None
See application file for complete search history.

(56) References Cited

U.S. PATENT DOCUMENTS

| 6,510,177 | B1 | 1/2003 | De Bonet et al. |
| 8,160,158 | B2 | 4/2012 | Choi et al. |
| 2012/0002726 | A1 | 1/2012 | Wu et al. |
| 2012/0201301 | A1 | 8/2012 | Bao et al. |

OTHER PUBLICATIONS

Wiegand, T., Sullivan, G.J., Bjøntegaard, G., and Luthra, A., "Overview of the H.264/AVC Video Coding Standard," IEEE Transactions on Circuits and Systems for Video Technology, vol. 13, pp. 560-576, Jul. 2003.

*Primary Examiner* — Kate Luo
(74) *Attorney, Agent, or Firm* — Ella Cheong Hong Kong; Sam T. Yip

(57) ABSTRACT

This invention discloses an encoding apparatus and a decoding apparatus for scalable video coding such that a non-scalable video decoder is usable for decoding a scalable video bit-stream comprising a base layer bit-stream and an enhancement layer bit-stream. In one embodiment, a source video frame is downscaled to give a downscaled video frame, which is then encoded into the base layer bit-stream. The difference between the source video frame and an up-scaled video frame reconstructed from the downscaled video frame in the base layer bit-stream yields a residual frame. The residual frame is partitioned into a number of residual sub-frames each having a resolution that is the downscaled video frame's resolution. The residual sub-frames are encoded into the enhancement layer bit-stream. Thereby, a non-scalable encoder is usable to encode both the downscaled video frame and the residual sub-frames, allowing both bit-streams to be decodable by employing only one non-scalable decoder.

9 Claims, 4 Drawing Sheets

SPATIAL SCALABLE VIDEO CODING USING NON-SCALABLE VIDEO CODEC

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to video coding, and more particularly, to spatial scalable video coding.

BACKGROUND

In spatial scalable video coding, the source video frame sequence of an original video signal is encoded into a base layer bit-stream and an enhancement layer bit-stream. It is possible that the base layer bit-stream alone can be decoded to recover the source video frame sequence. Alternatively, both the base layer bit-stream and the enhancement layer bit-stream can be used together to recover the source video frame sequence with a resolution that is higher than the one recovered if the base layer bit-stream alone is used. Such feature is useful, for example, in video broadcasting over the Internet.

In implementation of a scalable video transmission system, it is highly desirable if the scalable video coding method is such that non-scalable encoders and/or decoders can be used (or reused) in the system. One advantage is to enable easy upgrade from a non-scalable video transmission system to the scalable one. In this situation, the scalable video transmission system can be implemented with a low degree of modification to existing hardware used in the original non-scalable system.

In US20120002726, a spatial scalable video encoding method that enables the use of non-scalable encoders is disclosed. It is desirable if non-scalable video decoders can be employed. In particular, it is advantageous if "legacy" non-scalable decoders compliant to published video standards can be reused. There is a need in the art for a scalable video coding method that allows the use of non-scalable video decoders.

SUMMARY OF THE INVENTION

The present invention provides an apparatus for encoding a sequence of source video frames into a scalable video bit-stream that comprises a base layer bit-stream and an enhancement layer bit-stream. The apparatus comprises a preprocessor and an encoding unit. For an individual video frame in the sequence of source video frames, the preprocessor is configured to downscale said individual video frame by a pre-determined scale factor m, m being an integer at least 2, to yield a downscaled video frame having a resolution reduced by m times in each of x- and y-directions when compared to the resolution of said individual video frame. The encoding unit is configured to: execute a pre-determined video encoding algorithm to encode the downscaled video frame such that image information of the downscaled video frame is incorporated into the base layer bit-stream; and execute a decoding algorithm in order to decode the base layer bit-stream that has incorporated the image information of the downscaled video frame, and in order to reconstruct the downscaled video frame from the base layer bit-stream, thereby yielding a decoded base video frame. The preprocessor is further configured to: up-scale the decoded base video frame by a scale factor of m to yield an up-scaled decoded base video frame having a resolution that is said individual video frame's resolution; subtract said individual video frame by the up-scaled decoded base video frame to yield a residual frame; and divide the residual frame into N equal-size, non-overlapping residual sub-frames, $N=m^2$, wherein each of the N residual sub-frames has a resolution that is the downscaled video frame's resolution. In addition, the encoding unit is further configured to execute the pre-determined video encoding algorithm to encode each of the N residual sub-frames such that image information in said each of the N residual sub-frames is incorporated into the enhancement layer bit-stream.

The present invention also provides a corresponding apparatus configured to decode a scalable video bit-stream to generate a lower-resolution video frame and a higher-resolution video frame where the higher-resolution video frame has a resolution that is m times of the lower-resolution video frame's resolution in each of x- and y-directions, m being an integer at least 2. The scalable video bit-stream comprises a base layer bit-stream and an enhancement layer bit-stream. The base layer bit-stream is encoded with image information of the lower-resolution video frame. The enhancement layer bit-stream is encoded with image information of N residual sub-frames, $N=m^2$. Each of the N residual sub-frames has a resolution that is the resolution of the lower-resolution video frame. The higher-resolution video frame is generable based on the lower-resolution video frame and the N residual sub-frames. The apparatus comprises a decoding unit and a postprocessor. The decoding unit is configured to execute a pre-determined video decoding algorithm to decode the base layer bit-stream so as to reconstruct the lower-resolution video frame. The postprocessor is configured to up-scale the lower-resolution video frame by a scale factor of m to yield an up-scaled video frame having a resolution that is the higher-resolution video frame's resolution. The decoding unit is further configured to execute the pre-determined video decoding algorithm N times for decoding the enhancement layer bit-stream to reconstruct N residual sub-frames therefrom so as to yield N reconstructed residual sub-frames. The postprocessor is further configured to: non-overlappingly, spatially combine the N reconstructed residual sub-frames to form a reconstructed residual frame having a resolution that is the higher-resolution video frame's resolution; and add the reconstructed residual frame and the up-scaled video frame together to yield the higher-resolution video frame.

Other aspects of the present invention are also disclosed as illustrated by the embodiments hereinafter.

DETAILED DESCRIPTION OF THE INVENTION

A first aspect of the present invention is to provide an apparatus for encoding a sequence of source video frames into a scalable video bit-stream such that a non-scalable video decoder is usable for decoding the scalable video bit-stream. The scalable video bit-stream comprises a base layer bit-stream and an enhancement layer bit-stream. The disclosed encoding apparatus is configured to implement the method disclosed according to the first aspect of the present invention.

Figure 1:
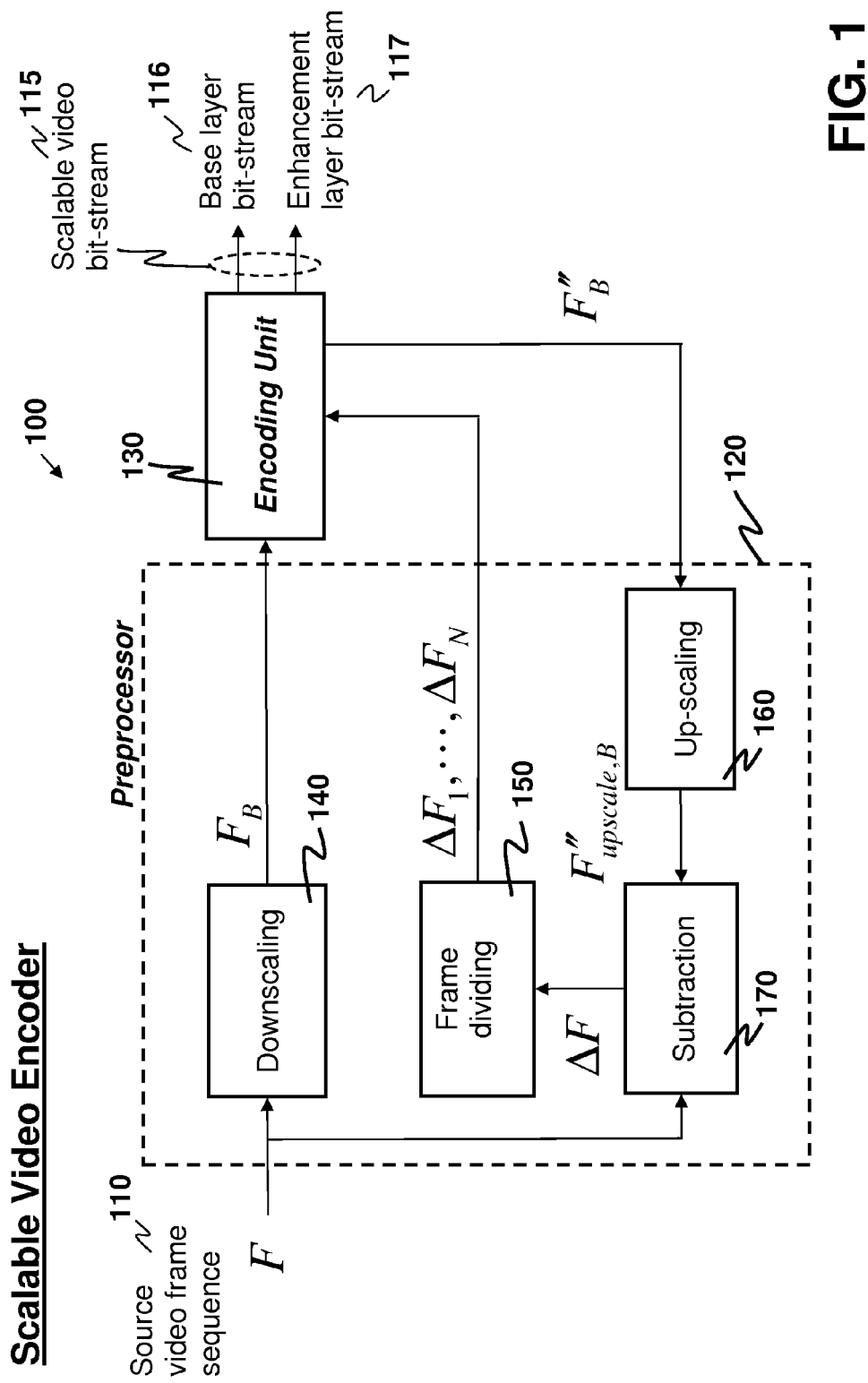
FIG. 1 depicts a scalable video encoder in accordance with an exemplary embodiment of the present invention.

FIG. 1 depicts a scalable video encoder, which is an exemplary embodiment of the disclosed encoding apparatus. A scalable video encoder 100 comprises a preprocessor 120 and an encoding unit 130. The preprocessor 120 receives a source video frame sequence 110 and interacts with the encoding unit 130 so that the encoding unit 130 produces a base layer bit-stream 116 and an enhancement layer bit-stream 117. Both of the bit-streams form a resultant scalable video bit-stream 115.

For an individual video frame F in the source video frame sequence 110, the preprocessor 120 is configured to downscale said individual video frame F by a pre-determined scale factor m, m being an integer at least 2, to yield a downscaled video frame $F_B$ having a resolution reduced by m times in each of x- and y-directions when compared to the resolution of said individual video frame F. As used herein, a resolution of a video frame is given by X×Y, where X and Y are the numbers of pixels of the video frame in the x-direction and the y-direction, respectively. As used herein, "downscaling" a video frame of resolution X×Y by a scale factor of n, n a positive integer, means reducing the size of this video frame proportionately in the x- and the y-directions by a factor n so as to yield a resultant video frame of resolution (X/n)×(Y/n), provided that X and Y are divisible by n. If said individual video frame F has a resolution W×H, the downscaled video frame $F_B$ has a resolution W'×H' where W'=W/m and H'=H/m. Generally, m is chosen to be a power of 2 although the present invention is not limited to this particular choice. For example, m may be chosen to be 2 or 4.

The encoding unit 130 is configured to execute a pre-determined video encoding algorithm to encode the downscaled video frame $F_B$ such that image information of the downscaled video frame $F_B$ is incorporated into the base layer bit-stream 116. In practical implementation of the encoding unit 130, the pre-determined video encoding algorithm that is employed may be an algorithm that complies with a published video standard, e.g., the H.264/AVC standard. By adopting the H.264/AVC standard for the pre-determined video encoding algorithm, the resultant encoding unit 130 is a non-scalable one.

Furthermore, the encoding unit 130 is configured to execute a decoding algorithm corresponding to the pre-determined video encoding algorithm in order to decode the base layer bit-stream 116 that has incorporated the image information of the downscaled video frame $F_B$, and in order to reconstruct the downscaled video frame $F_B$ from the base layer bit-stream 116. As a result, it yields a decoded base video frame $F''_B$ which is the downscaled video frame $F_B$ as reconstructed. The decoded base video frame $F''_B$ has a resolution W'×H'.

The preprocessor 120 is further configured to up-scale the decoded base video frame $F''_B$ by a scale factor of m to yield an up-scaled decoded base video frame $F''_{upscale,B}$ having a resolution that is the resolution of said individual video frame F. Similar to downscaling, "up-scaling" a video frame of resolution X×Y by a scale factor of n, n a positive integer, is defined herein as an operation to increase the size of this video frame proportionately in the x- and the y-directions by a factor n so as to yield a resultant video frame of resolution nX×nY. It follows that the resolution of the up-scaled decoded base video frame $F''_{upscale,B}$ is W×H.

In addition, the preprocessor 120 is further configured to subtract said individual video frame F by the up-scaled decoded base video frame $F''_{upscale,B}$. The subtraction is performed pixel-by-pixel. It yields a residual frame ΔF, where the subtraction is performed pixel-wise. That is, ΔF is given by $ΔF=F-F''_{upscale,B}$, and pixel-by-pixel subtraction between F and $F''_{upscale,B}$ is performed to obtain ΔF. Note that ΔF is the difference between F and $F''_{upscale,B}$, and that $F''_{upscale,B}$ can be easily obtained from the decoded base video frame $F''_B$. If ΔF is encoded and is also transmitted from a video source to a user, said individual video frame F, which has a higher resolution than the decoded base video frame $F''_B$, can be reconstructed at the user side by recovering ΔF and by obtaining $F''_B$ from the base layer bit-stream 116.

Figure 2:
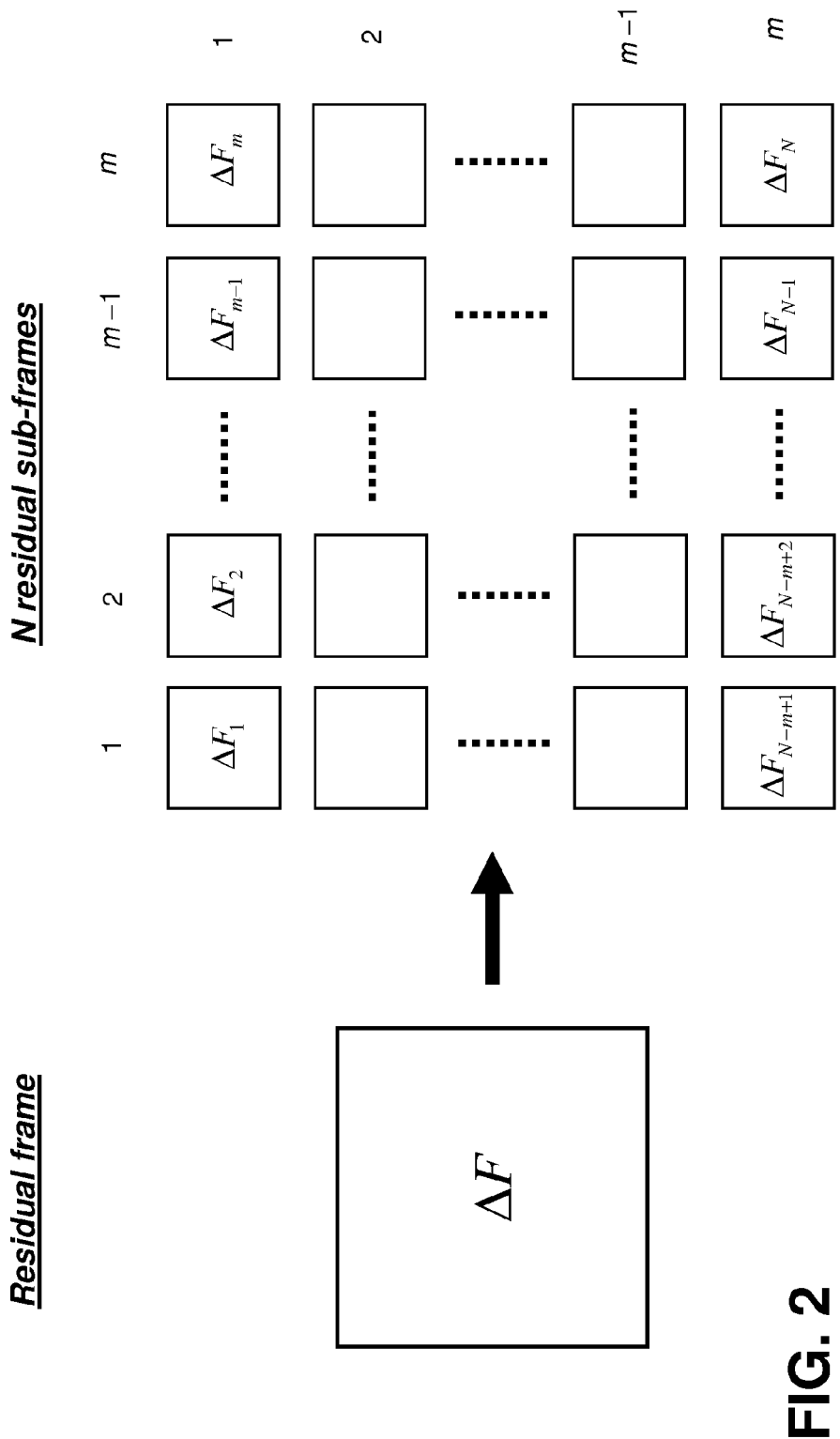
FIG. 2 depicts an example of dividing a residual frame into residual sub-frames for the scalable video encoder.

Additionally, the preprocessor 120 is further configured to divide the residual frame ΔF into N equal-size, non-overlapping residual sub-frames $ΔF_1, \ldots, ΔF_N$, where $N=m^2$. In particular, each of the N residual sub-frames $ΔF_1, \ldots, ΔF_N$ has a resolution that is the resolution of the downscaled video frame $F_B$. It follows that each of $ΔF_1, \ldots, ΔF_N$ has a resolution W'×H'. Dividing ΔF into $ΔF_1, \ldots, ΔF_N$ is accomplished by dividing, in the x-direction, one edge of ΔF into a first set of m equal-length segments and dividing, in the y-direction, another edge of ΔF into a second set of m equal-length segments. The N residual sub-frames $ΔF_1, \ldots, ΔF_N$ are formed by partitioning ΔF according to the first and the second sets of m equal-length segments. FIG. 2 shows an example of dividing ΔF into $ΔF_1, \ldots, ΔF_N$. The residual frame ΔF is partitioned into an m×m array of residual sub-frames. The N residual sub-frames are sequentially arranged in a row-wise manner. In this manner, the first row of the array has the residual sub-frames $ΔF_1, ΔF_2, \ldots, ΔF_m$ while the last row of the array (i.e. the m th row) is allocated with $ΔF_{N-m+1}, ΔF_{N-m+2}, \ldots, ΔF_N$.

The encoding unit 130 is further configured to execute the pre-determined video encoding algorithm to encode each of the N residual sub-frames $ΔF_1, \ldots ΔF_N$ such that image information in said each of the N residual sub-frames $ΔF_1, \ldots, ΔF_N$ is incorporated into the enhancement layer bit-stream 117. It follows that the encoding unit 130 reuses the pre-determined video encoding algorithm to encode the N residual sub-frames $ΔF_1, \ldots, ΔF_N$ as also employed in encoding the downscaled video frame $F_B$. As a result, the base layer bit-stream 116 and the enhancement layer bit-stream 117 are generable by using only one non-scalable encoding algorithm, allowing both of such bit-streams 116, 117 to be decodable by employing only one non-scalable decoding algorithm.

The inventors have observed that in subtracting F by $F''_{upscale,B}$ to obtain the residual frame ΔF, it is possible that some pixel values of ΔF become negative. The presence of negative pixel values can lead to encoding errors. As a result, the enhancement layer bit-stream 117 is not correctly encoded so that the N residual sub-frames $ΔF_1, \ldots, ΔF_N$ cannot be correctly decodable. To enable correct encoding of $ΔF_1, \ldots, ΔF_N$, preferably the preprocessor 120 is configured to add a pre-determined offset to each pixel value of the residual frame ΔF before the encoding unit 130 executes the pre-determined video encoding algorithm to encode each of the N residual sub-frames $ΔF_1, \ldots, ΔF_N$. The pre-determined offset is selected in order that all pixel values of the residual frame ΔF are non-negative. A preferable choice of the pre-determined offset is 128.

A second aspect of the present invention is to provide an apparatus configured to decode a scalable video bit-stream to generate a lower-resolution video frame and a higher-resolution video frame such that the apparatus uses only one non-scalable decoding algorithm to generate both the lower-resolution video frame and the higher-resolution video frame. The higher-resolution video frame has a resolution that is m times of the lower-resolution video frame's resolution in each of x- and y-directions where m is an integer at least 2. The scalable video bit-stream comprises a base layer bit-stream and an enhancement layer bit-stream. The base layer bit-stream is encoded with image information of the lower-resolution video frame. The enhancement layer bit-stream is encoded with image information of N residual sub-frames, $N=m^2$. The higher-resolution video frame is generable according to the lower-resolution video frame and the N residual sub-frames. Each of the N residual sub-frames has a resolution that is the resolution of the lower-resolution video frame. The disclosed decoding apparatus is configured to decode the scalable video bit-stream generated from an encoding apparatus as disclosed according to the first aspect of the present invention.

Figure 3:
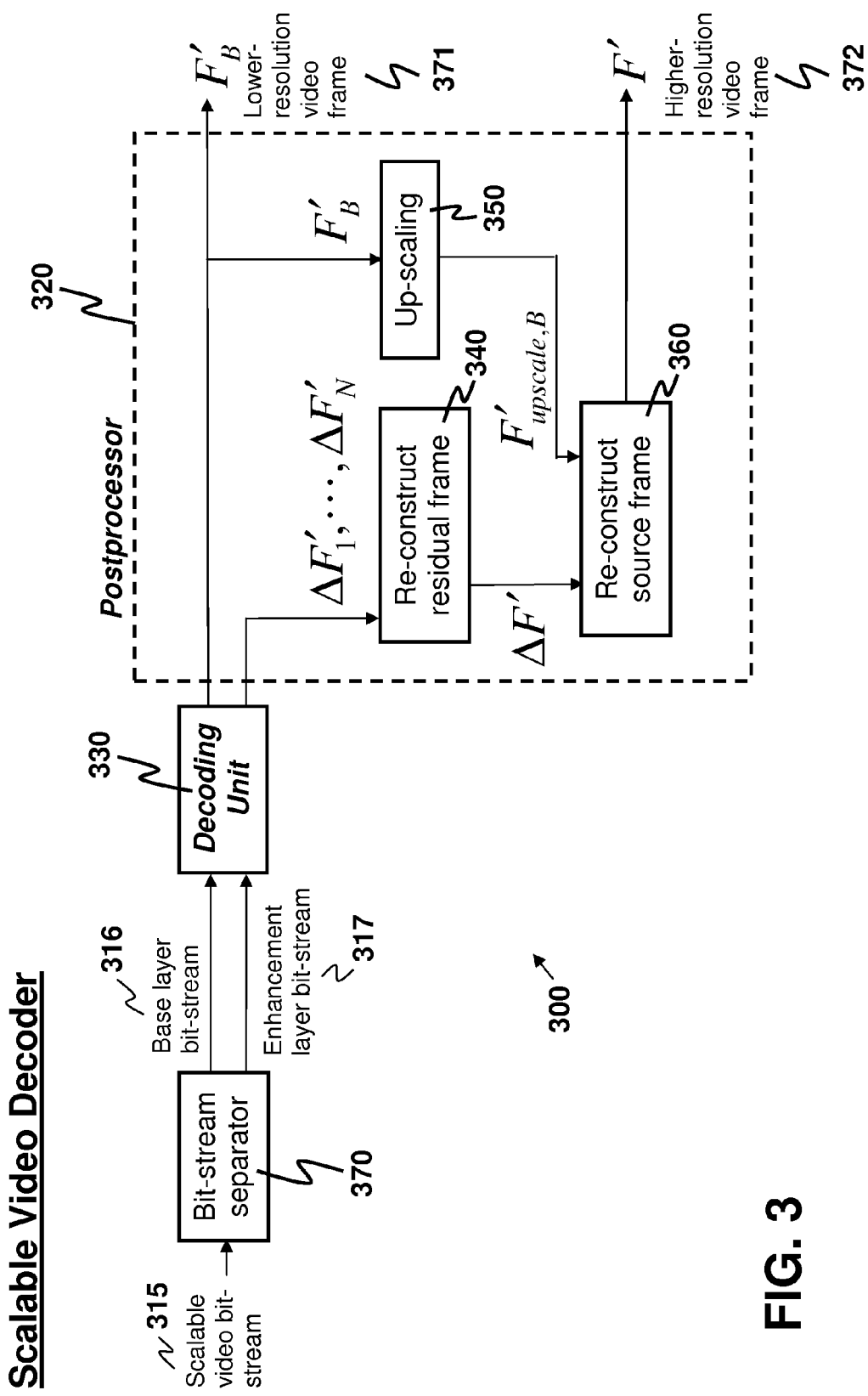
FIG. 3 depicts a scalable video decoder corresponding to the encoder of FIG. 1 and in accordance with an exemplary embodiment of the present invention.

An exemplary embodiment of the decoding apparatus is a scalable video decoder depicted in FIG. 3. A scalable video decoder 300 receives a scalable video bit-stream 315 comprising a base layer bit-stream 316 and an enhancement layer bit-stream 317, and generates a lower-resolution video frame 371, $F'_B$, and a higher-resolution video frame 372, F'. The resolution of F' is W×H and the resolution of $F'_B$ is W'×H', where W'=W/m and H'=H/m, and where m, an integer at least 2, is a pre-determined scale factor. The scalable video decoder 300 comprises a decoding unit 330 and a postprocessor 320.

The decoding unit 330 is configured to execute a pre-determined video decoding algorithm to decode the base layer bit-stream 316 so as to reconstruct the lower-resolution video frame 371, $F'_B$. The pre-determined video decoding algorithm that is adopted depends on which encoding algorithm has been used to obtain the base layer bit-stream 316 and the enhancement layer bit-stream 317. For example, the decoding algorithm is compliant to the H.264/AVC standard if the H.264/AVC standard has been adopted in generating both of these bit-streams 316, 317.

The postprocessor 320 is configured to up-scale the lower-resolution video frame 371, $F'_B$, by a scale factor of m to yield an up-scaled video frame $F'_{upscale,B}$ having a resolution that is the higher-resolution video frame 372's resolution.

The decoding unit 330 is configured to execute the pre-determined video decoding algorithm N times for decoding the enhancement layer bit-stream 317 to reconstruct N residual sub-frames therefrom so as to yield N reconstructed residual sub-frames $\Delta F'_1, \ldots, \Delta F'_N$.

Figure 4:
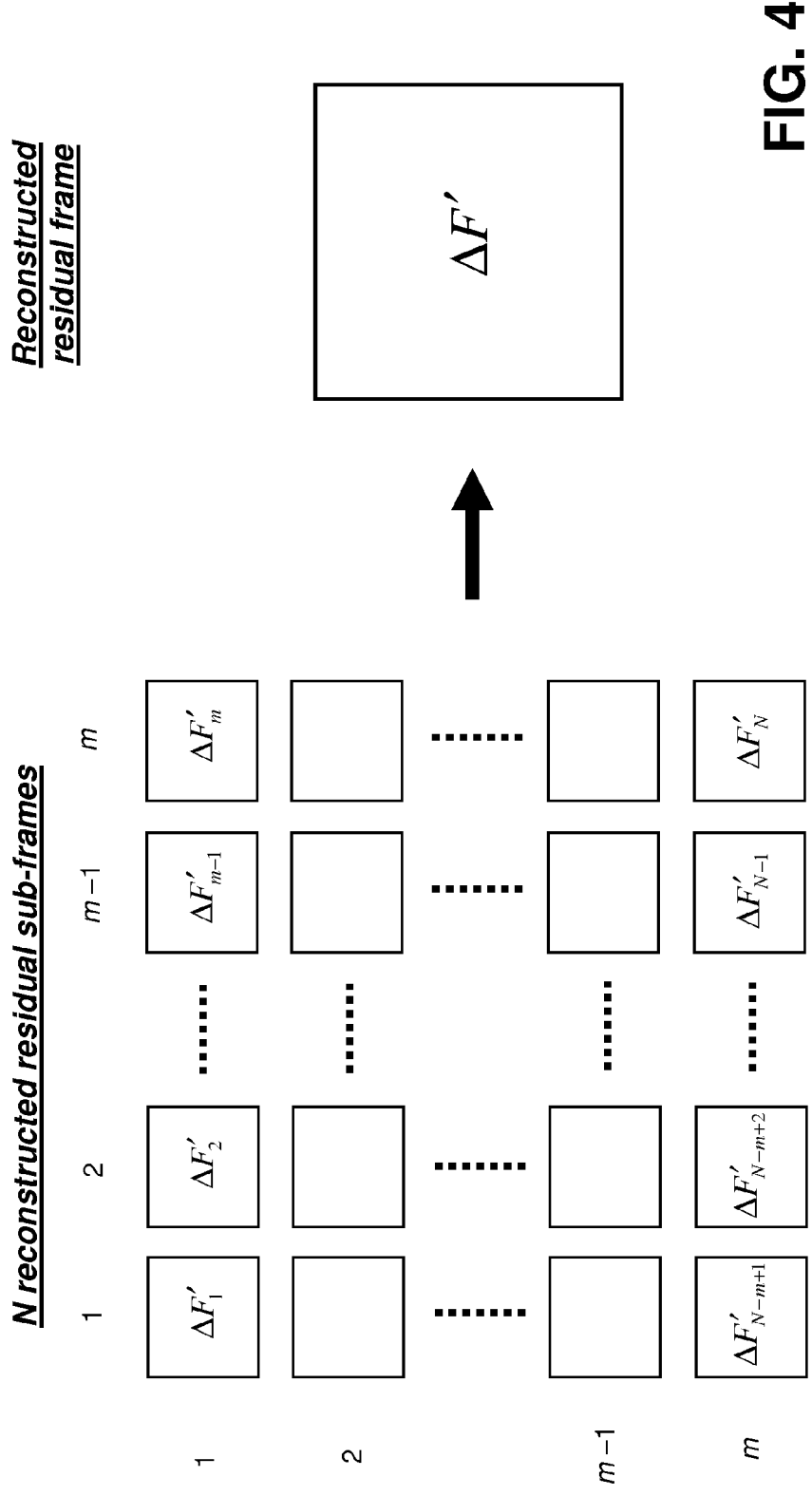
FIG. 4 depicts an example of combining reconstructed residual sub-frames to form a reconstructed residual frame for the scalable video decoder.

The postprocessor 320 is configured to non-overlappingly, spatially combine the N reconstructed residual sub-frames $\Delta F'_1, \ldots, \Delta F'_N$ to form a reconstructed residual frame $\Delta F'$. The reconstructed residual frame $\Delta F'$ has a resolution that is the higher-resolution video frame 372's resolution. The reconstruction of $\Delta F'$ from $\Delta F'_1, \ldots \Delta F'_N$ is accomplishable by arranging the N reconstructed residual sub-frames as an m×m array of reconstructed residual sub-frames in a pre-determined spatial order and then joining together the N reconstructed residual sub-frames that are arranged in the m×m array. FIG. 4 shows an example of spatially combining $\Delta F'_1, \ldots, \Delta F'_N$ to form $\Delta F'$. The N reconstructed residual sub-frames are first sequentially arranged in a row-wise manner. That is, the reconstructed residual sub-frames are filled into the m×m array one row by another. It follows that the first row of the array is filled with $\Delta F'_1, \Delta F'_2, \ldots, \Delta F'_m$ and the last row (i.e. the m th row) is occupied with $\Delta F'_{N-m+1}, \Delta F'_{N-m+2}, \ldots, \Delta F'_N$. Then all the N reconstructed residual sub-frames in the m×m array are non-overlappingly joined together to form the reconstructed residual frame $\Delta F'$.

The postprocessor 320 is configured to add the reconstructed residual frame $\Delta F'$ and the up-scaled video frame $F'_{upscale,B}$ together to yield the higher-resolution video frame 372, F'. It follows that $F'=\Delta F'+F'_{upscale,B}$. This addition is performed pixel-wise.

By configuring the scalable video decoder 300 as mentioned above, there is an advantage that the decoding unit 330 reuses the pre-determined video decoding algorithm to generate the N reconstructed residual sub-frames $\Delta F'_1, \ldots, \Delta F'_N$, where this decoding algorithm is also employed in generating the lower-resolution video frame 371. As a result, the scalable video decoder 300 is enabled to use only one non-scalable decoding algorithm to generate the lower-resolution video frame 371, $F'_B$, and the higher-resolution video frame 372, F'.

It is possible that, during an encoding process for generating the base layer bit-stream 316 and the enhancement layer bit-stream 317, a pre-determined offset is intentionally added to each pixel value of each of the N residual sub-frames in order to avoid encoding errors caused by negative pixel values. In order to compensate for the addition of this pre-determined offset made in the encoding process of obtaining the enhancement layer bit-stream 317, the postprocessor 320 is configured to subtract the pre-determined offset from each pixel value of the reconstructed residual frame $\Delta F'$ before adding $\Delta F'$ and $F'_{upscale,B}$ together.

The scalable video decoder 300 may further comprise a bit-stream separator 370 configured to separate the base layer bit-stream 316 from the enhancement layer bit-stream 317 in the scalable video bit-stream 315 so that the decoding unit 330 is allowed to separately receive the base layer bit-stream 316 and the enhancement layer bit-stream 317.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An apparatus for encoding a sequence of source video frames into a scalable video bit-stream where the scalable video bit-stream comprises a base layer bit-stream and an enhancement layer bit-stream, the apparatus comprising a preprocessor and an encoding unit, wherein:

for an individual video frame in the sequence of source video frames, the preprocessor is configured to downscale said individual video frame by a pre-determined scale factor m, m being an integer at least 2, to yield a downscaled video frame having a resolution reduced by m times in each of x-and y-directions when compared to said individual video frame's resolution;

the encoding unit is configured to execute a pre-determined video encoding algorithm to encode the downscaled video frame such that image information of the downscaled video frame is incorporated into the base layer bit-stream;

the encoding unit is configured to execute a decoding algorithm corresponding to the pre-determined video encoding algorithm in order to decode the base layer bit-stream that has incorporated the image information of the downscaled video frame, and in order to reconstruct the downscaled video frame from the base layer bit-stream, thereby yielding a decoded base video frame which is the downscaled video frame as reconstructed;

the preprocessor is configured to up-scale the decoded base video frame by a scale factor of m to yield an up-scaled decoded base video frame having a resolution that is the resolution of said individual video frame;

the preprocessor is configured to subtract said individual video frame by the up-scaled decoded base video frame to yield a residual frame;

the preprocessor is configured to divide the residual frame into N equal-size, non-overlapping residual sub-frames, $N=m^2$, wherein each of the N residual sub-frames has a resolution that is the downscaled video frame's resolution; and the encoding unit is configured to execute the pre-determined video encoding algorithm to encode each of the N residual sub-frames such that image information in said each of the N residual sub-frames is incorporated into the enhancement layer bit-stream;

whereby the encoding unit reuses the pre-determined video encoding algorithm to encode the N residual sub-frames as also employed in encoding the downscaled video frame so that the base layer bit-stream and the enhancement layer bit-stream are generable by using only one non-scalable encoding algorithm, allowing both of such bit-streams to be decodable by employing only one non-scalable decoding algorithm.

2. The apparatus of claim 1, wherein before the encoding unit executes the pre-determined video encoding algorithm to encode each of the N residual sub-frames, the preprocessor is configured to add a pre-determined offset to each pixel value of the residual frame, the pre-determined offset being selected in order that all pixel values of the residual frame are non-negative.

3. The apparatus of claim 2, wherein the pre-determined offset is 128.

4. The apparatus of claim 1, wherein the pre-determined video encoding algorithm is compliant to the H.264/AVC standard.

5. An apparatus configured to decode a scalable video bit-stream to generate a lower-resolution video frame and a higher-resolution video frame where the higher-resolution video frame has a resolution that is m times of the lower-resolution video frame's resolution in each of x- and y-directions, m being an integer at least 2, the scalable video bit-stream comprising a base layer bit-stream and an enhancement layer bit-stream, the base layer bit-stream being encoded with image information of the lower-resolution video frame, the enhancement layer bit-stream being encoded with image information of N residual sub-frames, $N=m^2$, each of the N residual sub-frames having a resolution that is the resolution of the lower-resolution video frame, the higher-resolution video frame being generable based on the lower-resolution video frame and the N residual sub-frames, the apparatus comprising a decoding unit and a postprocessor, wherein:

the decoding unit is configured to execute a pre-determined video decoding algorithm to decode the base layer bit-stream so as to reconstruct the lower-resolution video frame;

the postprocessor is configured to up-scale the lower-resolution video frame by a scale factor of m to yield an up-scaled video frame having a resolution that is the higher-resolution video frame's resolution;

the decoding unit is configured to execute the pre-determined video decoding algorithm N times for decoding the enhancement layer bit-stream to reconstruct N residual sub-frames therefrom so as to yield N reconstructed residual sub-frames;

the postprocessor is configured to non-overlappingly, spatially combine the N reconstructed residual sub-frames to form a reconstructed residual frame having a resolution that is the higher-resolution video frame's resolution; and the postprocessor is configured to add the reconstructed residual frame and the up-scaled video frame together to yield the higher-resolution video frame;

whereby the decoding unit reuses the pre-determined video decoding algorithm to generate the N reconstructed residual sub-frames as also employed in generating the lower-resolution video frame, enabling the apparatus to use only one non-scalable decoding algorithm to generate the lower-resolution video frame and the higher-resolution video frame.

6. The apparatus of claim 5, wherein before adding the reconstructed residual frame and the up-scaled video frame together, the postprocessor is configured to subtract a pre-determined offset from each pixel value of the reconstructed residual frame in order to compensate for an addition of this pre-determined offset made in an encoding process of obtaining the enhancement layer bit-stream.

7. The apparatus of claim 6, wherein the pre-determined offset is 128.

8. The apparatus of claim 5, wherein the pre-determined video decoding algorithm is compliant to the H.264/AVC standard.

9. The apparatus of claim 5, further comprising a bit-stream separator configured to separate the base layer bit-stream from the enhancement layer bit-stream in the scalable video bit-stream received by the apparatus so that the decoding unit is allowed to separately receive the base layer bit-stream and the enhancement layer bit-stream.

* * * * *